United States Patent
Jeon et al.

(10) Patent No.: US 6,904,134 B2
(45) Date of Patent: Jun. 7, 2005

(54) NETWORK INFRASTRUCTURE INTEGRATED SYSTEM

(75) Inventors: Paul Jeon, Seoul (KR); Won Kwang Baik, Seoul (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 09/880,857

(22) Filed: Jun. 15, 2001

(65) Prior Publication Data

US 2001/0053207 A1 Dec. 20, 2001

(30) Foreign Application Priority Data

Jun. 16, 2000 (KR) .......................................... 2000-33317

(51) Int. Cl.[7] ............................................. H04M 11/00
(52) U.S. Cl. ................................ 379/93.07; 379/90.01; 340/310.01
(58) Field of Search ........................... 379/90.01, 93.07, 379/93.36, 102.01–102.02, 106.04, 392–392.01, 394, 102.04; 340/310.01–310.08, 825.58; 455/402

(56) References Cited

U.S. PATENT DOCUMENTS

| | | | | |
|---|---|---|---|---|
| 3,876,984 A | * | 4/1975 | Chertok ................. | 340/825.58 |
| 4,514,594 A | * | 4/1985 | Brown et al. ................ | 455/401 |
| 5,937,342 A | * | 8/1999 | Kline .......................... | 455/402 |
| 5,997,170 A | * | 12/1999 | Brodbeck .................... | 700/236 |
| 6,040,759 A | * | 3/2000 | Sanderson ............. | 340/310.01 |
| 6,107,912 A | * | 8/2000 | Bullock et al. ......... | 340/310.01 |
| 6,492,897 B1 | * | 12/2002 | Mowery, Jr. ........... | 340/310.01 |
| 6,529,589 B1 | * | 3/2003 | Nelson et al. ......... | 379/102.01 |

* cited by examiner

*Primary Examiner*—George Eng
(74) *Attorney, Agent, or Firm*—Birch, Stewart, Kolasch & Birch, LLP

(57) ABSTRACT

A network infrastructure integrated system which is able to integrate a telephone line network and a power line network as a single network using a simple circuit includes a first network to which a plurality of Home Information Machines are connected; a second network to which a plurality of Home Information Machines are connected; and a network bridge connected between the first and second networks and enabling the Home Information Machines to share respective applications and data with each other, whereby the cost can be reduced, the interchangeability is increased, and the accessibility to the network can be increased by using both the power lines and the telephone lines.

13 Claims, 4 Drawing Sheets

NETWORK INFRASTRUCTURE INTEGRATED SYSTEM

BACKGROUND OF THE INVENTION

1. Field of the Invention

The present invention relates to a network infrastructure integrated system, and particularly, to a network infrastructure integrated system which integrates a telephone line network and an electric power line network separately installed in a home into a single network.

2. Description of the Background Art

As data communication systems become more highly developed recently, in order to efficiently use systems connected to different respective networks from each other, network users share applications and data included in the respective networks by integrating the respective networks into a single network. The users share the applications and data, whereby the cooperation of the respective systems are performed, and the users are able to use the respective systems more efficiently. Therefore, between the systems connected to respectively different networks from each other, interexchangeability of the applications and data should be maintained using protocols made by standardization authorities.

As described above, communication is an essential factor in everyday life and is being developed continually. Therefore, the development of communication skills increases the needs of the usual users for information, and the users can use multimedia services in their home using the Internet. Especially, some users try to construct a network infrastructure system which is easily accessed even in a small space or in their home.

Accordingly, users are able to construct a home network system using wireless devices, telephone lines, or power lines, and are able to receive/transfer audio information, video information, and data file information at a high speed.

FIG. 1 shows a general home network infrastructure system. As shown therein, the system includes a gateway system 10 connected to the PSTN (Public Switched Telephone Network) and to the Internet and converting communication protocols therebetween; a telephone line network 20 connected to the gateway system 10 and constituting a separate network using the telephone line wiring in the home; a plurality of PNA (Phoneline Networking Alliance) modems 30A, 30B, . . . , and 30N; Home Information Machines 40A, 40B, . . . , and 40N (for example, a personal computer, a printer, or a video camera, etc.); a power line network 60 constituting another separate network using the power lines in the home; a plurality PLC (Power Line Communication) modems 70A, 70B, . . . , 70N connected to the power line network 60 and modulating/demodulating data signals transmitted and received therethrough; a plurality of Home Information Machines 80A, 80B, . . . , 80N transmitting/receiving data signals modulated/demodulated through the PLC modems 70A, 70B, . . . , 70N; and a router 50 transferring/receiving data signals between the telephone line network 20 and the power line network 60.

Operation of the conventional network infrastructure integrated system constructed as above will now be described.

Generally, the data signals transmitted over the home network include a header information portion and a data information portion. The header information portion includes a destination information of where the data signal is intended to arrive, and the data signal portion includes an address of a terminal such as the Home Information Machines 40 or 80 where the data signal is intended to arrive. Therefore, when the user wants to transfer data from an Home Information Machine connected to the telephone line network 20 to an Home Information Machine connected to the telephone line network 20 and to the power line network 60, and to an Home Information Machine (not shown) connected to another home network, the data signal is modulated in the PNA modem 30A connected to the Home Information Machine 40A, and then the data signal is broadcasted to all Home Information Machines (40B, 40C, . . . , 40N, 80A, 80B, . . . , 80N) connected to the telephone line network 20 and to the power line network 60 and broadcasted to the gateway system 10 through the telephone line network 20. Hereinafter, this process will be described in more detail as follows.

1) in order to transfer the data signal which is broadcasted to the Home Information Machines 40B, 40C, . . . , 40N connected to the telephone line network 20, first, the data signal is transferred to the PNA modems 30B, 30C, . . . , 30N connected to the telephone line network 20 through the telephone line network 20.

The PNA modem 30 is standardized by a standardization authority as a Home PNA, and it connects information communication appliances into a single network using the telephone lines installed in the home. That is, users can share a printer, peripheral appliances, files, application programs, and play network computer games by connecting to the Internet via the telephone line network 20 using the PNA modem 30 based on the Home PNA standard, and home automation can be made. In addition, voice and video data can be transferred using IP(Internet Protocol), and at the same time a phone call can be made. In order to perform these operations, the PNA modems 30A, 30B, . . . , 30N include information of the addresses of the Home Information Machines 40A, 40B, . . . , 40N connected to them, and the transferring speed is 10 Mbps.

Therefore, the PNA modems 30B, 30C, . . . , 30N compare the addresses of their connected Home Information Machines 40B, 40C, . . . , 40N with the destination information of the received data signal. At that time, the PNA modem 30B connecting the Home Information Machine 40B which has the same address and the destination information as the received data signal, demodulates the data signal and transfers the data signal to the Home Information Machine 40B connected to the PNA modem 30B. However, the other PNA modems 30C, 30D, . . . , 30N connected to the telephone line network 20 do not have same addresses of the Home Information Machines connected to them as the destination information, and accordingly, ignore the data signal.

2) In order to transfer the broadcasted data signal to the Home Information Machines 80A, 80B, . . . , 80N connected to the power line network 60, the data signal is transferred to the router 50 through the telephone line network 20.

The router 50 includes a PNA modem 30 and a PLC modem 70, and the PNA modem 30 included in the router 50 demodulates the data signal and transfers it to the PLC modem 70. The PLC modem 70 in the router 50 modulates the data signal for transmission without noise in the signal on the power lines. After that, the router 50 broadcasts the data signal to the respective Home Information Machines 80A, 80B, . . . , 80N installed on the power line network 60. Therefore, the data signal is transferred through the power line network 60 to the PLC modems 70 connected to the power line network 60.

The PLC modem types are classified into a modem for high voltage lines, for a low voltage lines, and for home power lines. The PLC modem 70 for home power lines modulates/demodulates a high frequency carrier of hundreds KHz~tens MHz with the data signal so as to be transferred over the power lines carrying alternating current of 50~60 Hz, and includes addresses of the Home Information Machines connected to itself.

However, the PLC modem is not standardized, and it requires sophisticated technology, so accordingly it is not generally suitable for the high quality communication network.

The PLC modems 70A, 70B, ..., 70N connected to the power line network 60 compare the addresses of the Home Information Machines 80A, 80B, ..., 80N connected to them with the destination information of the received data signals. The PLC modem 70A having connected to it a machine having the same address as the destination information demodulates the data signal and transfers it to the Home Information Machine 80A connected to the PLC modem 70A. However, the other PLC modems 70B, 70C, ..., 70N connecting to the power line network 60 those machines which have different addresses from the destination information of the data signal, ignore the data signal.

3) In order to transfer the broadcasted data signal to other Home Information Machines (not shown) connected to an external network, the data signal is transferred to the gateway system 10 through the telephone line network 20.

The gateway system 10 includes a PNA modem 30 connected with the external network, and the data signal is demodulated in the PNA modem 30 and converted into a protocol suitable for the external network and transferred to the Home Information Machines (not shown) connected to the external network.

4) In order to transfer a data signal from a Home Information Machine (not shown) connected to another home network, from another Home Information Machine 40B, 40C, ..., 40N connected to the telephone line network, or from the Home Information Machines 80A, 80B, ..., 80N connected to the power line network to the Home Information Machine 40A, the data signal is transferred in the opposite order from 1), 2), and 3) above.

However, in the network infrastructure system according to the conventional art, the router 50 is expensive, whereby the economical efficiency is lowered. In addition, if the user wants to construct a home network using only the telephone line network 20, additional wiring is needed because the telephone lines in the home typically have fewer connection terminals (jacks) than the power lines and telephone line connection terminals (sockets)do not exist in many places.

SUMMARY OF THE INVENTION

Therefore, an object of the present invention is to provide a network infrastructure integrated system which is able to integrate a telephone line network and a power line network using a simple circuit.

To achieve the object of the present invention, there is provided a network infrastructure integrated system including a telephone line network 20 to which a first plurality of Home Information Machines 40A, 40B, ..., 40N are connected; a power line network 60 to which a second plurality of Home Information Machines 80A, 80B, ..., 80N are connected; a gateway system 10 converting data communication protocols between the telephone and power line networks 60 and external networks; and a network bridge 100 allowing the Home Information Machines 40A, 40B, ..., 40N, 80A, 80B, ..., 80N to share the respective applications and data.

The foregoing and other objects features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Description will now be given in detail of the preferred embodiment of the present invention, with reference to the accompanying drawings.

Figure 1:
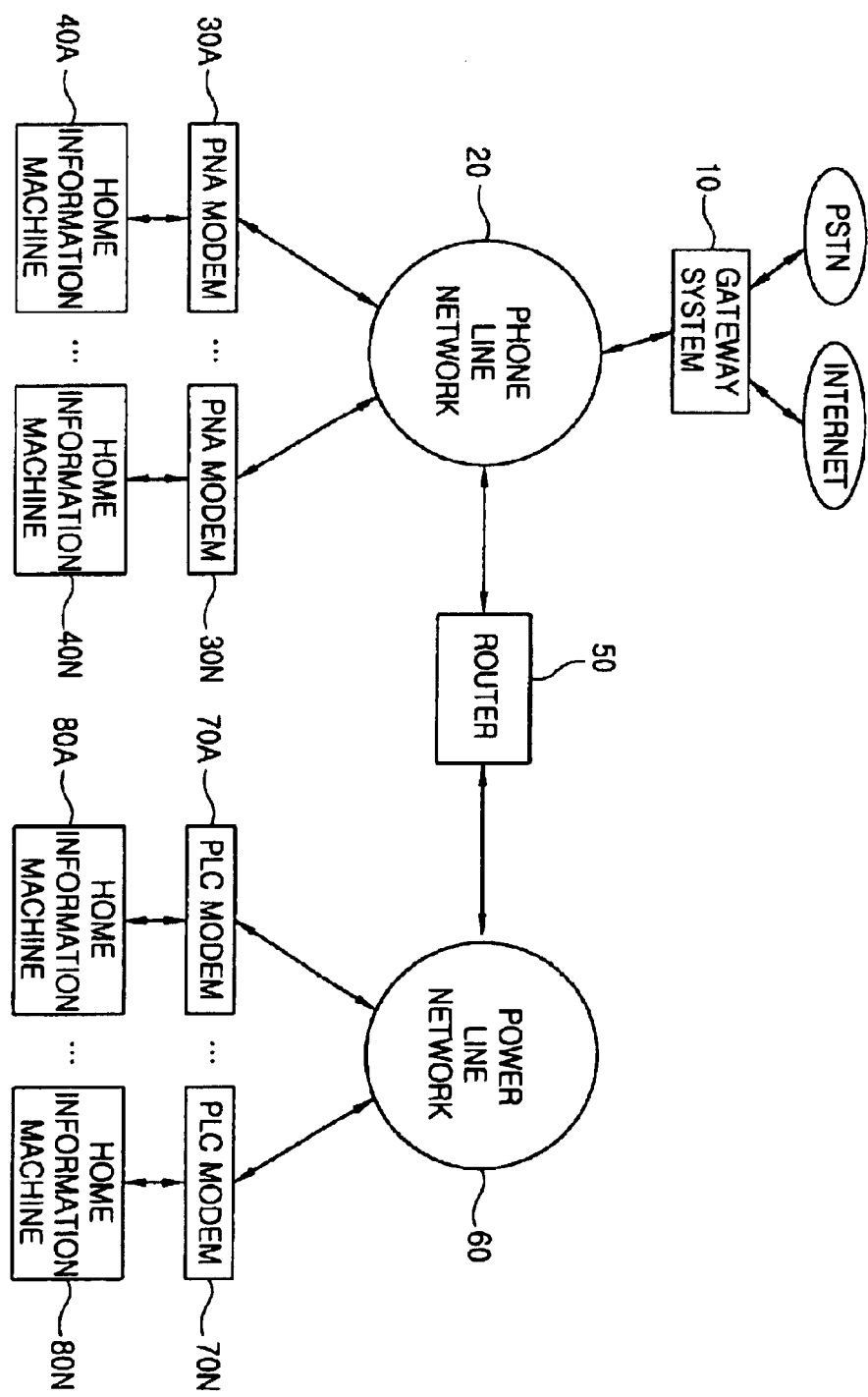
FIG. 1 is a schematic block diagram of a conventional home network infrastructure system.
Figure 2:
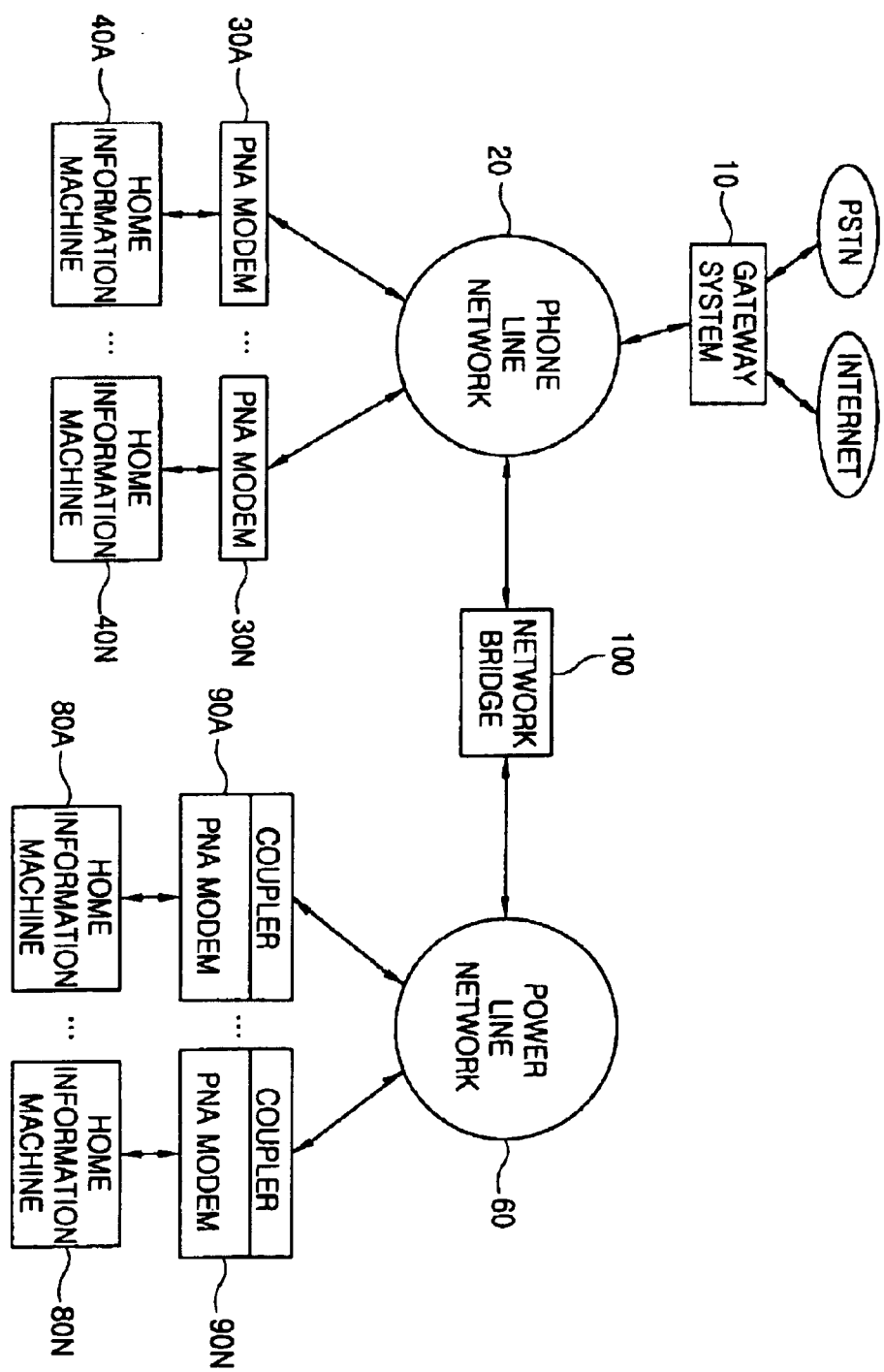
FIG. 2 is a schematic block diagram of a home network infrastructure system according to the present invention.

FIG. 2 is a schematic block diagram showing a home network infrastructure integrated system according to the present invention. As shown therein, there are provided a gateway system 10 connected to the PSTN (Public Switched Telephone Network) or to the Internet, and converting a communication protocols therebetween; a telephone line network 20 connected to the gateway system 10 and constituting a separate network (e.g. a phoneline intranet) using the telephone line wiring in a home; a plurality of PNA (Phoneline Networking Alliance) modems 30A, 30B, ..., 30N connected to the telephone line network 20 and modulating/demodulating data signals transmitted/received therethrough; a plurality of Home Information Machines 40A, 40B, ..., 40N (for example, a personal computer, a printer, or a video camera) each connected to a respective one of the PNA modems 30A, 30B, ..., 30N and receiving the modulated/demodulated data signals; a power line network 60 constituting a separate network using the power lines; PNA modems 90A, 90B, ..., 90N, in each of which a power line coupler is installed, connected to the power line network 60 and modulating/demodulating data signals; a plurality of Home Information Machines 80A, 80B, ..., 80N each receiving the modulated/demodulated data signal through a respective one of the PNA modems having power line coupler 90A, 90B, ..., 90N; and a network bridge 100 transferring/receiving data signals between the telephone line network 20 and the power line network 60.

Figure 3:
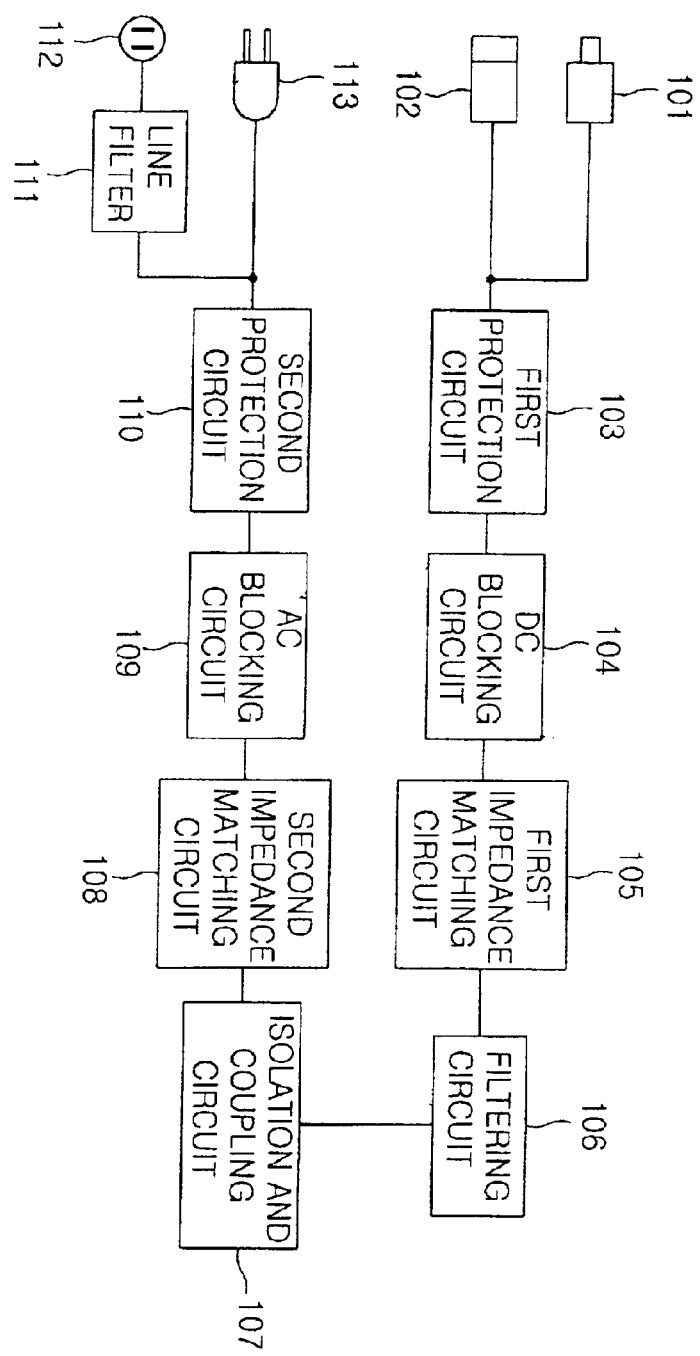
FIG. 3 is a schematic block diagram showing a network bridge according to the present invention.

FIG. 3 is a schematic block diagram showing the network bridge 100 according to the present invention. The network bridge 100 includes a first plug device 101 suitable for being connected to the telephone line network 20 and inputting/ outputting data signals therewith; a first protection circuit 103 connected to the first plug device 101 and protecting the other circuit from an overvoltage and from a surge voltage; a DC (Direct Current) blocking circuit 104 connected to the first protection circuit 103 and blocking DC component of the data signals received from the telephone line; a first impedance matching circuit 105 connected to the DC blocking circuit 104 and matching a load impedance of the data signals with an impedance value of the PNA modem 30 which is set earlier; a filtering circuit 106 connected to the first impedance matching circuit 105 and band-pass filtering inputted data signals therewith; a second plug 113 suitable for being connected to the power line network and inputting/outputting data signals therewith; a line filter 111 connected to the second plug circuit 113 and attenuating noise from the connected Home Information Machines 40B, 40C, . . . , 40N; a second protection circuit 110 connected to the second plug 113 and protecting the other circuits from an overvoltage and from a surge voltage on the power lines; an AC (Alternating Current) blocking circuit 109 connected to the second protection circuit and blocking the AC power line component of the received data signals; a second impedance matching circuit 108 connected to the AC blocking circuit 109 and matching a load impedance of the data signals with the set impedance value of the PNA modem; and an isolation and coupling circuit 107 disposed between the second impedance matching circuit 108 and the filtering circuit 106 and electrically isolating the telephone line network and the power line network from one another while coupling signals therebetween. Reference numerals 102 and 112 designate a telephone jack and a power socket.

The home network infrastructure integrated system adopting the network bridge according to the present invention will now be described with reference to FIGS. 2 and 3.

When a user wants to transfer data from an Home Information Machine 40A connected with the home telephone line network 20 to other Home Information Machines 40B, 40C, . . . , 40N, 80A, 80B, . . . , 80N connected to the home telephone line network 20 and to the home power line network 60, and to the other Home Information Machines (not shown) connected to other home networks, the data signal is modulated in the PNA modem 30A connected to the Home Information Machine 40A, and the data signal is broadcasted and transferred to all the Home Information Machines 40A, 40B, . . . , 40N, 80A, 80B, . . . , 80N and to the gateway system 10 through the telephone line network 20. Hereinafter, the process will be described in more detail.

1) in order to transfer the broadcasted data signal to the Home Information Machines 40B, 40C, . . . , 40N connected to the telephone line network 20, the data signal is transferred through the telephone line network 20 to the PNA modems 30B, 30C, . . . , 30N connected to the telephone line network 20.

The PNA modems 30B, 30C, . . . , 30N compare the addresses of the Home Information Machines 40B, 40C, . . . , 40N connected to themselves with the destination information of the received data signal. At that time, among those PNA modems, the PNA modem 30B connected to the machine 40B which has same address as the destination information portion of the data signal demodulates the data signal and transfers it to the Home Information Machine 40B connected to itself. However, the other PNA modems 30C, 30D, . . . , 30N which are connected to machines which have different addresses than the destination information portion of the data signal ignore the data signal.

2) In order to transfer the broadcasted data signal to the electric appliances 80A, 80B, . . . , 80N connected to the power line network 60, first, the data signal is transferred via the first plug 101 to the network bridge 100.

From the first plug 101 the data signal inputted into the network bridge 100 is applied to the first protection circuit 103.

The first protection circuit 103 includes a fuse and a varistor, and it protects the network bridge 100 and transfers the data signal to the DC blocking circuit 104.

The DC blocking circuit 104 includes a decoupler having a capacitor, and blocks the DC component of the data signal while transferring the data signal to the first impedance matching circuit 105.

The first impedance matching circuit 105 includes a load resistance of about 10 KΩ, and it matches the data signal to the load impedance value of the PNA modem 30. The first impedance matching circuit 105 transfers the data signal to the filtering circuit. If the load resistance is set too high, the amplitude of the received data signal is not sufficient, and if the load resistance is set too low, a large current is needed to drive the PNA modem 30. Therefore, the total impedance of the data signals in a home phoneline network is set as 50Ω by a PNA agreement.

The filtering circuit 106 band-pass filters the data signal transferred thorough the first impedance matching circuit 105.

Figure 4:
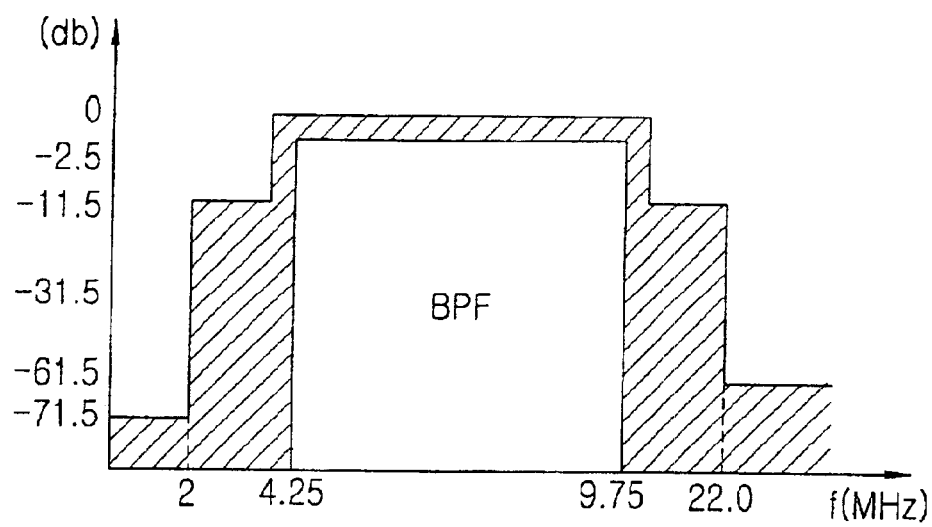
FIG. 4 is a graph showing a signal characteristic before filtering of a data signal transferred from the network bridge and showing an ideal BPF (Band Pass Filter) characteristic of the network bridge.

FIG. 4 is a graph showing the signal characteristic before filtering of the data signal transferred from the network bridge 100, and showing an ideal BPF (Band-Pass Filtering) characteristic. As shown therein, the part shaded by oblique strokes designates the data signal bandwidth and amplitude before filtering, and the unshaded part designates the ideal BPF characteristic. The bandwidth of the data signals is 4.25 MHz~9.75 MHz, and any signals outside the above band are considered as noise.

Figure 5:
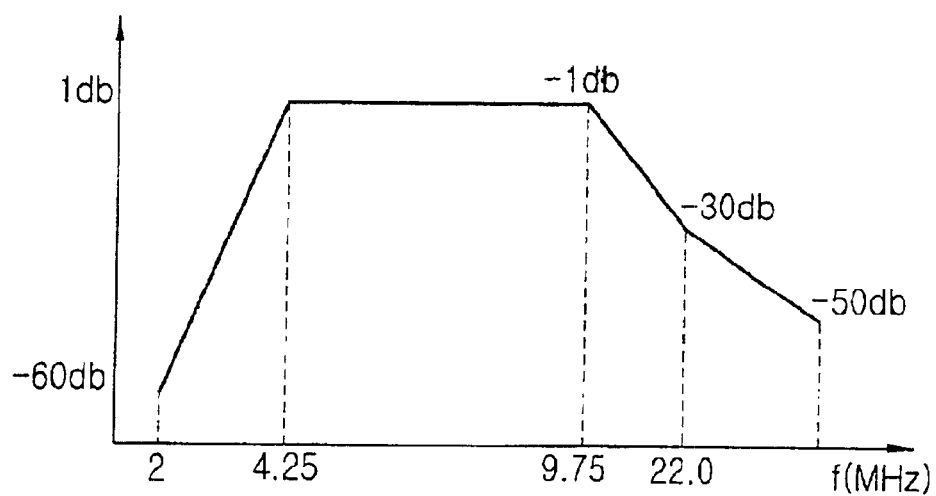
FIG. 5 is a graph showing a actual BPF characteristic of the network bridge according to the present invention.

FIG. 5 is a graph showing an actual BPF characteristic as a result of testing a band-pass filter of the network bridge according to the present invention. The data signal passes in the range of 4.25 MHz~9.75 MHz; however, the noise is attenuated by 60 dB in the range of 0 MHz~4.25 MHz, by 30 dB in the 9.75 MHz~22.0 MHz band, and by 50 dB in the range above the 22.0 MHz.

Therefore, the filtering circuit 106 removes the out-of-band from noise the data signal of interest in the frequency range of 4.25 MHz~9.75 MHz, and transfers the data signal to the isolation and coupling circuit 107.

The isolation and coupling circuit 107 may, for example, be implemented as a transformer which has respective windings connected to the telephone line side and to the power line side, in a 1:1 ratio or other suitable ratio, and isolates the telephone line and the power line sides of the network bridge 100.

Alternatively, the isolation and coupling circuit 107 may be implemented using optoisolators or other suitable devices, as will be apparent to those skilled in the art.

The data signal coupled via the isolation and coupling circuit 107 and passed through the second impedance matching circuit 108, . . . , 112 is transferred to the power line network 60 through the socket, and then transferred via the power line network 60 to the PNA modems 90A, 90B, . . . , 90N which include couplers for being connected to the power line network 60.

The PNA modems 90A, 90B, . . . , 90N compare the addresses of the Home Information Machines 80A, 80B, . . . , 80N connected to themselves with the destination information portion of the received data signal. At that time, the PNA modem 90A connected with the machine 80A having the same address as the destination information portion of the data signal demodulates the data signal and transfers it to the Home Information Machine 80A connected to itself. However, the other PNA modems 90B, 90C, . . . , 90N connected to the power line network 60 are connected with machine have different addresses from the destination information portion of the data signal, and therefore these ignore the data signal.

The PNA modem 90 performs the same role as that of the PLC (Power Line Communication) modem of the conventional art. Also, the second impedance matching circuit 108, the AC blocking circuit 109, the second protection circuit 110, the second plug 113, and the line filter 111 do not affect the data signal transferred from the isolation and coupling circuit 107.

3) In order to transfer the data signal to Home Information Machines(not shown) connected to another, external network in another region, first, the data is signal is transferred to the gateway system 10 through the telephone line network 20.

The gateway system 10 includes a PNA modem 30. The data signal is demodulated in the PNA modem 30, and then the gateway system 10 converts the data signal to a protocol suitable for transmission to the other network, and the data signal is transferred to the Home Information Machines (not shown) connected to the other network.

As described above, in order to transfer the data signal from the Home Information Machine (not shown) connected to the other network, from the other Home Information Machines 40B, 40C, . . . , 40N connected to the telephone line network, and from the Home Information Machines 80A, 80B, . . . , 80N connected to the power line network 60 to the one Home Information Machine 40A connected to the telephone line network 20, the data signal is transferred in the opposite order of 1), 2), and 3). This process will be described in more detail as follows.

4) If the user wants to transfer data from the other Home Information Machines 40B, 40C, . . . , 40N connected to the telephone line network 20 to the one Home Information Machine 40A connected to the telephone network 20, the data signal is modulated in the PNA modem 30B, 30C, . . . , 30N connected to the corresponding other Home Information Machine 40B, 40C, . . . , 40N, and broadcasted. The data signal is transferred through the telephone line network 20 to the PNA modems 30B, 30C, . . . , 30N connected to the telephone line network 20.

The PNA modems 30B, 30C, . . . , 30N compare the addresses of the Home Information Machines 40B, 40C, . . . , 40N connected to themselves with the destination information portion of the data signal. At that time, the PNA modem 30B connected to the Home Information Machine 40B having the same address as the destination information portion of the data signal demodulates the data signal and transfers it to the Home Information Machine 40B connected to itself. However, the other PNA modems 30C, 30D, . . . , 30N connected to the telephone network 20 ignore the data signal because the machines connected to these have different addresses from the destination information.

5) In order to transfer the data signal from the one Home Information Machine 80A connected to the power line network 60 to the one Home Information Machine 40A connected to the telephone line network 20, the PNA modem 90A modulates the data signal and transfers the data signal to the power line network 60 to broadcast it. The broadcasted data signal is inputted via second plug to the network bridge 100 through the power line network 60.

The second plug 113 inputs/outputs the data signal by connecting to the power line network 60 in the home.

The data signal passed via the second plug 113 is inputted into the second protection circuit 110 through the line filter 111 which prevents the entrance of the noise from the other Home Information Machines 80B, 80C, . . . , 80N, and the second protection circuit 110 transfers the data signal inputted from the second plug 113 to the AC blocking circuit 109.

The AC blocking circuit 109 blocks the AC component of the data signal, and the data signal is coupled to the second impedance matching circuit 108.

The second impedance matching circuit 108 matches the data signal to the load impedance value of the PNA modem 90, and after that, the data signal is transferred to the filtering circuit. However, much noise is still included with the data signal up to this point. Therefore, the filtering circuit 106 removes the noise included with the data signal, and transfers the filtered data signal to the isolation and coupling circuit 107.

The isolation and coupling circuit 107 isolates the telephone line and the power line sides of the network bridge 100, but does not affect the data signal.

The data signal coupled by the isolation and coupling circuit 107 is transferred through the telephone line network 20 to the PNA modems 30A, 30B, . . . , 30N.

The PNA modems 30A, 30B, . . . , 30N compare the addresses of the Home Information Machines 40A, 40B, . . . , 40N connected to themselves with the destination information portion of the data signal. At that time, the PNA modem 30A to which is connected the one Home Information Machine 40A having the same address as the destination information portion of the data signal demodulates the data signal and transfers the demodulated data signal to the Home Information Machine 40A. However, the other PNA modems connected to the telephone line network 20 ignore the data signal because the electric appliances 30B, 30C, . . . , 30N connected to themselves have different addresses from the destination information portion of the data signal. The first impedance matching circuit 105, the DC blocking circuit 104, the first protection circuit 103, and the first plug 101 do not affect the data signal passed there through from the isolation and coupling circuit 107.

6) In order to transfer the data signal from a Home Information Machine (not shown) connected to an extended network to one of the Home Information Machines 40A, 40B, . . . , 40N connected to the telephone line network 20, the data signal is transferred to the gateway system 10 from the PSTN and the Internet.

The PNA modem included in the gateway system 10 modulates the data signal and broadcasts the data signal to the PNA modems 30A, 30B, . . . , 30N connected to the telephone line network 20. If, for example, the destination of the data signal is the Home Information Machine 40A connected to the telephone line network 20, when the data signal is received by the PNA modem 30A. In addition, if the destination information of the data signal and the address of the Home Information Machine 40A connected to the PNA modem 30A, the PNA modem demodulates the data signal and transfers it to the Home Information Machine 40A. However, the other PNA modems 30B, 30C, . . . , 30N ignore the data signal because the addresses of the Home Information Machines 40B, 40C, . . . , 40N connected to themselves are not same as the destination information of the data signal.

Alternatively to the above-described embodiment, the gateway system 10 may not be connected to the telephone line network 20, but connected to the power line network 60, whereby the gateway system 10 is able to receive/transfer data with the PSTN or with the Internet. That is, the gateway system 10 would include a PNA modem 90 in which is installed a power line coupler, and such PNA modem having a power line coupler modulate/demodulate the data signal when the data signal is inputted/outputted through the gateway system 10.

As described above, according to the present invention, a telephone line network and a power line network can be integrated without using a router of high cost, whereby the integration cost is able to be reduced compared to the conventional system.

Also, the standardized PNA modem is used instead of the PLC modem which is not standardized, whereby the interchangeability is enhanced, and the accessibility is able to be increased because both the telephone lines and the power lines can be used.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A network infrastructure integrated system comprising:
   a telephone line network to which a first plurality of home information machines are respectively each connected via a PNA modem;
   a power line network to which a second plurality of home information machines are respectively each connected via a PNA modem having a couvler;
   a gateway system connected with one of the telephone line network and the power line network for converting communication protocols of the telephone line network or power line network and an external network and transferring data signals between the telephone line network or power line network and the external network; and
   a network bridge connected between the telephone line network and the power line network for enabling the first and second pluralities of home information machines to communicate data signals with each other between the telephone line network and the power line networks;
   wherein the network bridge includes an input protection means for protecting internal circuitry thereof and removing unwanted electric components of the data signal flowing between the telephone line network and the power line network, and matching means connected to the input means for matching the data signal to an impedance value of the PNA modem between the telephone line network and the power line network.

2. The system according to claim 1, wherein the gateway system includes PNA modems.

3. The system according to claim 1, wherein the first plurality of home information machines connected to the telephone line network each a include a phone line networking alliance (PNA) modem, the second plurality of Home Information Machines connected to the power line network each include a PNA modem having a coupler for connecting to a power line, and the gateway system includes a PNA modem.

4. The system according to claim 1, wherein the telephone line network includes at least one phone line networking alliance (PNA) modem, the power line network includes at least one PNA modem having a coupler for connecting to a power line, and the gateway system also includes a PNA modem having a coupler for connecting to a power line.

5. The system according to claim 1, wherein the first plurality of home information machines connected to the telephone line each include a phone line networking alliance (PNA) modem, the second plurality of Home Information Machines connected to the power line network each include a PNA modem having a coupler for connecting to a power line, and the gateway system also includes a PNA modem having a coupler for connecting to a power line.

6. The system according to claim 1, wherein the network bridge further includes an output means connected to the matching means for coupling the data signals between the telephone line network and power line network and filtering the data signals.

7. The system according to claim 6, wherein the input means includes a plug against inputting/outputting the data signal, a protection means for protecting an overvoltage and a surge voltage, and a blocking means connected to the protection means and blocking DC or AC components.

8. The system according to claim 7, wherein the protection means includes a line filter for preventing admission of noise generated from the home information machines.

9. The system according to claim 6, wherein a load impedance resistance value in the matching means is 10 kΩ.

10. The system according to claim 6, wherein the output means includes an isolation and coupling means for isolating the telephone line network and the power line network from each other, a filtering means for band-pass filtering the data signal, and a socket for connecting the telephone line network or the power line network.

11. The system according to claim 10, wherein the isolation and coupling means has a transformer in which the telephone line network side and on the power line network side are connected to a respective coil winding having a same number with each other.

12. The system according to claim 10, wherein the filtering means is a band-pass filter which passes only signals in a range of 4.25 MHz~9.75 MHz.

13. The system according to claim 1, wherein the telephone line network and the power line network are integrated without using a router.

* * * * *